(12) United States Patent
Testa et al.

(10) Patent No.: US 11,008,776 B2
(45) Date of Patent: May 18, 2021

(54) SECURITY DEVICE FOR HOLDING AND SHARING A KEY

(71) Applicant: Y.Share S.r.l., Milan (IT)

(72) Inventors: Andrea Testa, Monza (IT); Margherita Colleoni, Milan (IT); Sergio Matteo Savaresi, Cremona (IT); Gianmarco Odorizzi, Trento (IT); Vincenzo Russi, Milan (IT); Ivo Emanuele Francesco Boniolo, Bovisio Masciago (IT); Marcello Vena, Milan (IT); Stefano Bottelli, Varese (IT); Giovanni Alli, Legnano (IT)

(73) Assignee: Y.SHARE S.R.L., Milan (IT)

( * ) Notice: Subject to any disclaimer, the term of this patent is extended or adjusted under 35 U.S.C. 154(b) by 374 days.

(21) Appl. No.: 16/088,477

(22) PCT Filed: Mar. 29, 2017

(86) PCT No.: PCT/IB2017/051793
§ 371 (c)(1),
(2) Date: Sep. 26, 2018

(87) PCT Pub. No.: WO2017/168341
PCT Pub. Date: Oct. 5, 2017

(65) Prior Publication Data
US 2020/0299998 A1  Sep. 24, 2020

(30) Foreign Application Priority Data

Apr. 1, 2016  (IT) .......................... 102016000033761
Jun. 3, 2016  (IT) .......................... 102016000057155

(51) Int. Cl.
*E05B 19/00*  (2006.01)
*B60R 25/24*  (2013.01)
(Continued)

(52) U.S. Cl.
CPC .......... *E05B 19/0005* (2013.01); *B60R 25/24* (2013.01); *E05B 45/06* (2013.01);
(Continued)

(58) Field of Classification Search
CPC .. E05B 19/0005; E05B 45/06; E05B 47/0012; E05B 2045/065; B60R 25/24; G07C 9/00896; G07C 9/00936
(Continued)

(56) References Cited

U.S. PATENT DOCUMENTS 10,896,559 B2 *  1/2021  Werner ..................... G06F 1/28
2007/0273534 A1  11/2007  McGinn et al.
2009/0167526 A1  7/2009  Graves et al.

FOREIGN PATENT DOCUMENTS

DE        19854018 A1    5/2000
DE    102005059061 A1    6/2007
(Continued)

OTHER PUBLICATIONS

International Search Report and Written Opinion in PCT/IB2017/051793 dated Jul. 27, 2017.

*Primary Examiner* — Suzanne L Barrett
(74) *Attorney, Agent, or Firm* — Manelli Selter PLLC; Edward Stemberger

(57) ABSTRACT

Safety device (1) for holding and sharing among a plurality of users a key (100) provided with a remote control (102). The safety device (1) includes:
- an external housing (2) adapted to internally contain said key (100), configurable according to an open configuration and a closed configuration;
- a lock (5) that can be commanded for switching between a closed status, that prevents said external housing (2) in the closed configuration from switching into the open configuration, and an open status, that enables the external housing (2) to switch between the open and the closed configurations;

(Continued)

means for interacting with said remote control (102) of the key (100);
a transmission unit (18) configured to receive, directly or via an external server (107), command signals from an external command device (19); and
a command and control unit (17).

14 Claims, 13 Drawing Sheets

(51) Int. Cl.
    *E05B 45/06*     (2006.01)
    *E05B 47/00*     (2006.01)
    *G07C 9/00*     (2020.01)

(52) U.S. Cl.
    CPC ...... *E05B 47/0012* (2013.01); *G07C 9/00896* (2013.01); *E05B 2045/065* (2013.01); *G07C 2009/00936* (2013.01)

(58) Field of Classification Search
    USPC .......................................................... 70/57.1
    See application file for complete search history.

(56) References Cited

FOREIGN PATENT DOCUMENTS

| DE | 102012015925 A1 | 3/2014 |
|---|---|---|
| EP | 1808336 A1 | 7/2007 |
| WO | 2009102194 A1 | 8/2009 |

* cited by examiner

SECURITY DEVICE FOR HOLDING AND SHARING A KEY

TECHNICAL FIELD OF THE INVENTION

The object of the present invention is a safety device for holding and sharing keys equipped with a remote control, such as for example the start-up keys of a car provided with a remote control for opening and closing the doors of the car itself, wherein said remote control can operate by means of suitable pushbuttons or by means of proximity detection. In the present description the safekeeping of the start-up keys of a car will be given by way of example, but the safety device according to the invention equally suits the safekeeping of whatever key, wherein such remote control opens or closes a protected environment in general. Note also that the word "key" does not simply indicate a mechanical key, but refers to any general device adapted to open/close and/or to activate additional functions such as for example the vehicle start-up, similar to that of a key, for example an electronic or a magnetic key.

PRIOR ART

With reference for example to the automobile industry, the need to share the same car among several users is recently more and more common. This need may arise among a small group of people, such as for example among different members of the same family, or in more structured systems, where the same car can be shared among several users who do not know each other (so-called car sharing).

The need to share car keys, necessary to open/close and to start the car itself, therefore arises among a number of people which can be smaller or larger.

In case of a limited number of users who share the same car (for example in a family unit), keys are simply passed from one person to another depending on their need. This system leads to problems because the keys to share can be left by the last user in a place difficult to reach for the next user, or the last user may forget to bring the keys in a place easily accessible to all users, when he last used them.

In some car sharing systems instead, keys are normally available inside the vehicle. The car is remotely opened once the user has been identified (typically by means of a special application installed on the user's smartphone). Later, the user enters the vehicle and starts it by the key, remotely authorized to start said vehicle. Therefore, even if a prowler pried the vehicle doors open and attempted to start it by the key, the vehicle would not start, since the start-up has not been remotely authorized.

Such car sharing systems require, first of all, a priori knowledge of the vehicle that will be shared in order to activate the previously described security functions; secondly, they require a complex installation that can only be performed by a technician capable of interconnecting such systems with the vehicle electronics. For this reason, they are not appropriate in a context of peer-to-peer car sharing, due to the high installation cost on vehicles which are not natively equipped with them.

In addition, the car sharing system is naturally designed for a large number of cars and users and, therefore, it cannot be reasonably applied to a limited context such as a family, since numerous adaptations to the vehicle are necessary, as well as a complex information system for the operational, administrative, accounting, maintenance management of the sharing and of the shared vehicles.

More generally, there is a current need to share keys safely. For example, in case of deficiency of sets of keys, equipped for example with a remote control for the activation and deactivation of a home security system, and whose number can be enough for a whole family unit, sometimes the available keys are left in places accessible to anyone (such as under doormats), with the risk that some prowler may grab them.

Moreover, the large number of companies and home sharing management sites for townhouses and holiday homes creates a growing need to share keys safely and remotely, i.e. without a physical meeting of the people involved.

A safety device for safekeeping keys, equipped with a remote control, is described in document DE 10 2005 059061 A1.

BRIEF SUMMARY OF THE INVENTION

The underlying problem of the present invention is therefore to make available a safety device, which allows only authorized users to hold, make available and act on keys equipped with a remote control, which may easily be used among limited groups of persons, but which guarantees such security levels that it may be used even in larger groups of persons and with no relationship between them, such as car-sharing, bike sharing, boat sharing or home sharing systems.

This and other objects are achieved by means of a safety device according to claim 1.

The dependent claims define possible advantageous embodiments of the invention.

The device according to the invention ensures good safety, is not limited to the scope (then in case it is used for holding vehicle start-up keys, it does not depend on the vehicle model and/or its equipment) and is easy to install and to use for the user.

BRIEF DESCRIPTION OF THE FIGURES

To better understand the invention and appreciate its advantages, some of its nonlimiting exemplary embodiments will be described below, referring to the attached figures, wherein.

DESCRIPTION OF THE INVENTION EMBODIMENTS

Figure 1:
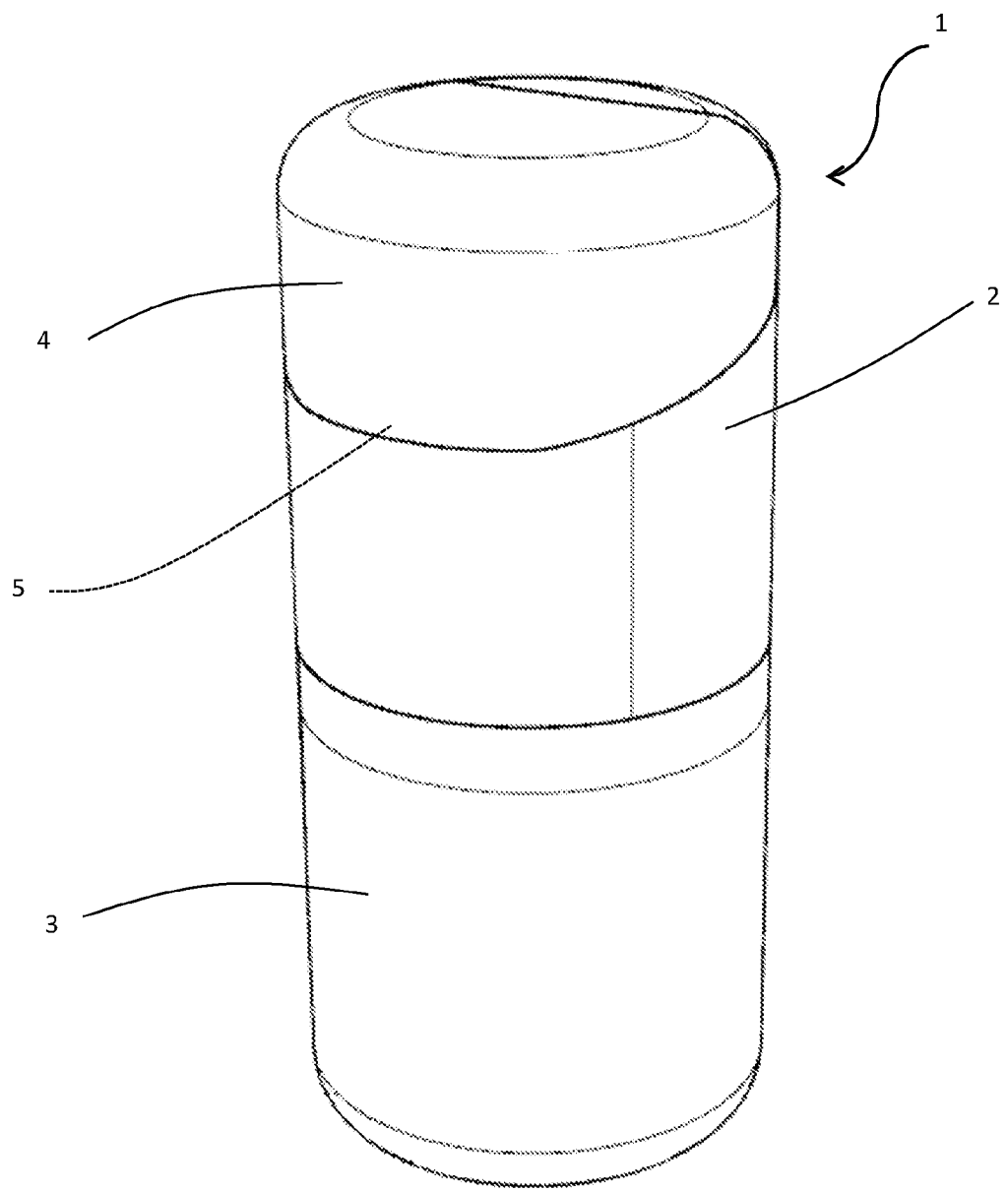
FIG. 1 is a perspective view of a safety device according to a possible embodiment of the invention.
Figure 2:
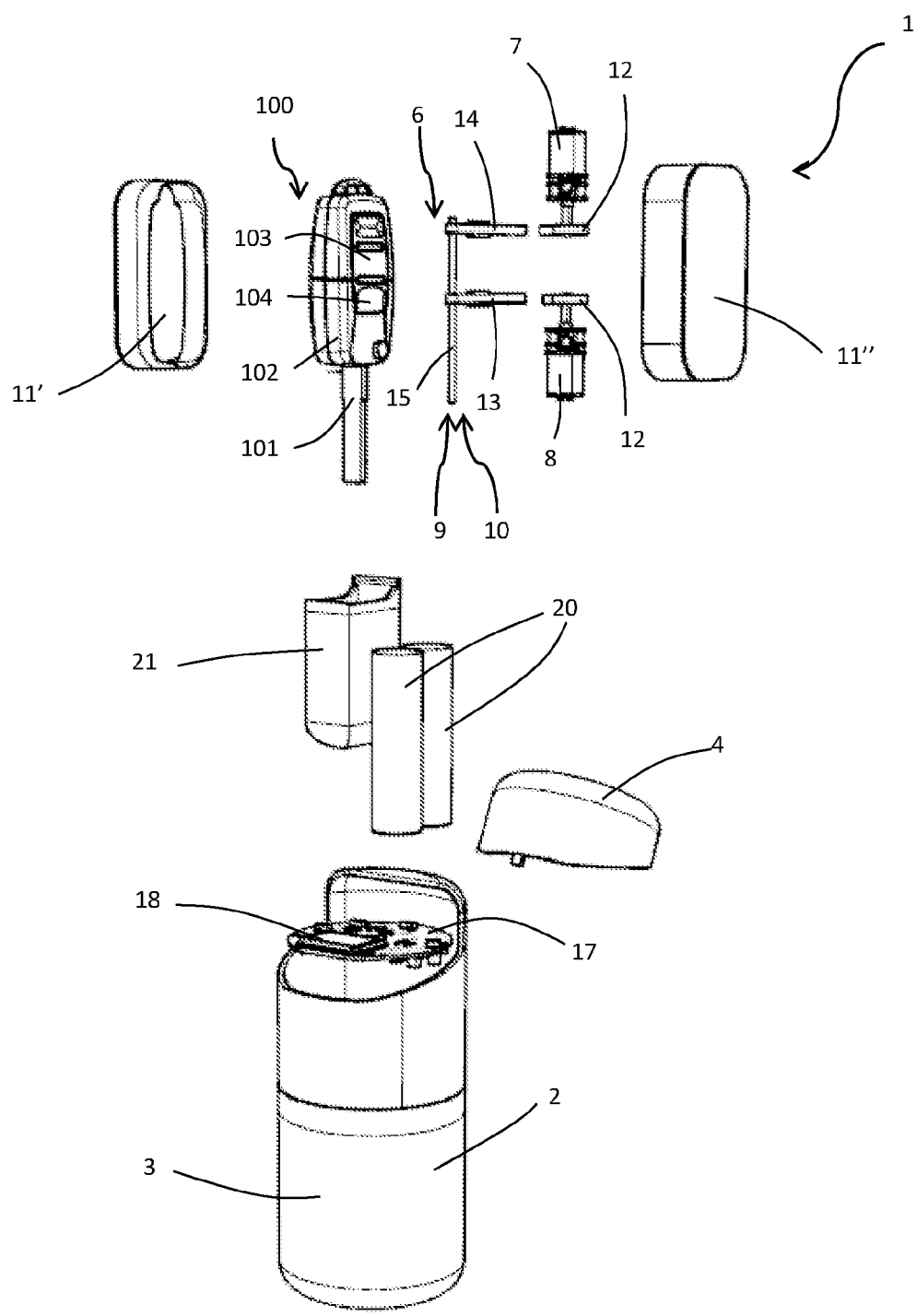
FIG. 2 is an exploded view of safety device in FIG. 1.
Figure 3:
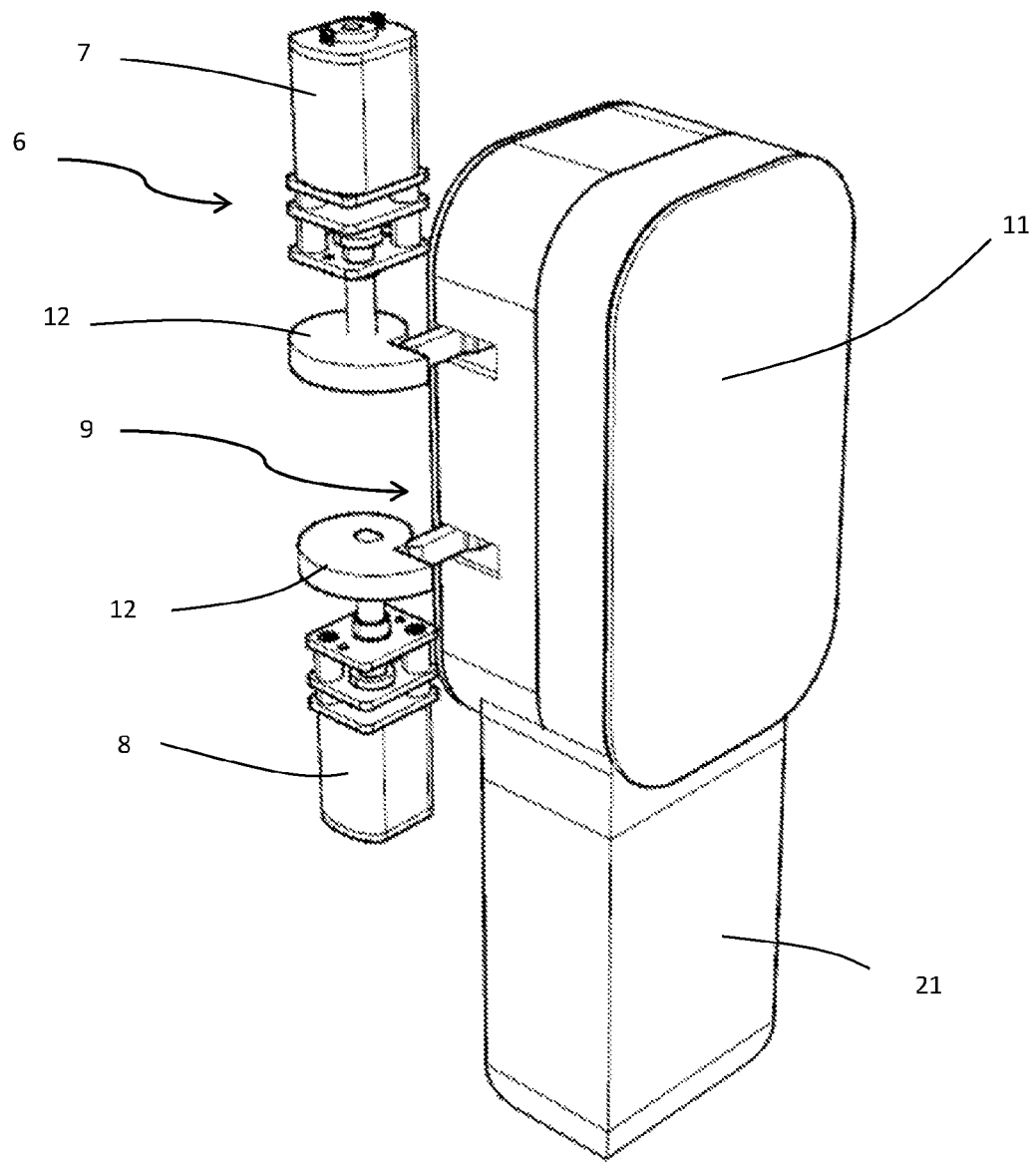
FIG. 3 is a perspective view of an internal portion of the device in FIG. 1.

With reference to the attached figures, a safety device according to the invention is indicated as a whole with reference 1. Safety device 1 is intended to hold and to share a key 100, as explained in the introductory part of the present description. With reference, by way of example, to a common key 100 of a car, it comprises a portion 101, used for starting the vehicle, which may for example be a shaped metal portion adapted to be inserted in a corresponding start-up socket on the dashboard of the vehicle itself, and a remote control 102, for example a radio control, for opening and closing the vehicle. The remote control 102 comprises an opening pushbutton 103 and a closing pushbutton 104 and, actuating them, the user can open or close the vehicle locks, electrically operated by the control unit of the vehicle itself. The opening 103 and closing 104 pushbuttons may be physically separated or distinct parts of the same pushbutton.

Note that, alternatively, the remote control 102 may not be equipped with the opening 103 and closing 104 pushbuttons and the opening/closing of the doors (and in case also the vehicle start-up authorization, for example, by unlocking the immobilizer system of the vehicle itself, which can be started, for example, by means of a button of the vehicle itself) may be based on the proximity detection of the key to the place to open/close, or alternatively the remote control 102 may further comprise the opening 103 and closing 104 pushbuttons, but it may be adapted to authorize the vehicle start-up, following the above methods by means of proximity detection. Such keys are commonly called keyless keys. With reference to a car, the car locks are opened and/or the vehicle start-up is authorized, when the key is close to the car itself, and are closed and/or the vehicle start-up is inhibited, when the key gets adequately far from the car. Such systems may be based, for example, on a RFID transmitter integrated in the remote control of the key, which communicates with a corresponding receiver integrated in the vehicle.

Safety device 1 is generally intended to hold the key 100, whatever its nature, allowing access to authorized users only.

Safety device 1 comprises an external housing 2 which defines an inner space wherein the key 100 is held. The external housing may be configured according to a closed configuration and to an open configuration. In the closed configuration it is not possible to access the inner space of the external housing 2, while in the open configuration such an access is possible, and therefore the user can insert and remove the key 100 into/from safety device 1. According to a possible embodiment, the external housing 2 comprises a first 3 and a second 4 half-shells separable from each other, for example by pressing, snapping or relative screwing. When the first 3 and the second 4 half-shells are joined, the external housing 2 is in the closed configuration, while, when the first 3 and the second 4 half-shells are separated, the external housing 2 is in the open configuration. Of course, alternative configurations of the external housing 2 are possible. For example, the first 3 and the second 4 half-shells may be hinged together and not separable.

Safety device 1 further comprises locking means, such as for example a lock 5, preferably electrically controlled, controllable to switch between a closed status and an open status. In the closed status, lock 5 prevents the external housing 2, when it is in the closed configuration, from switching into the open configuration. On the contrary, in the open status, the lock 5 allows the external housing to switch between the open and the closed configurations. Therefore, if the key 100 is in the external housing 2 in the closed configuration and with the lock 5 in the closed status, it will impossible for the user to have access to the key until lock 5 switches into the open status. With reference to the possible above-described embodiment of the external housing 2, the lock 5, in the closed status, acts on the first 3 and on the second 4 half-shells in such a way that it is not possible to separate them.

Safety device 1 can differently be configured depending on the key type to hold.

In accordance with a possible embodiment, in case the key to hold is with remote control provided with opening and closing pushbuttons, safety device 1 comprises an actuation system 6, operable to activate, by mechanical pressure, the opening 103 and closing 104 pushbuttons of the remote control 102 of the key 100, when said key is inside the external housing 2 in the closed configuration. In particular, according to a possible embodiment, the actuation system 6 comprises one or more actuators intended to actuate the opening 103 and the closing 104 pushbuttons of the key 100. The actuators can be of different types. For example, they may include: gear motors, linear actuators, piezoelectric actuators, magnetic actuators, solenoid actuators, electro-hydraulic actuators, electro-pneumatic actuators. The actuation system 6 can act on the opening 103 and closing 104 pushbuttons either directly or through a leverage mechanism 9. In addition, the actuation system 6 and/or the leverage mechanism 9 may be fixedly linked to the external housing 2 or may be movable to take different positions with respect to the external housing 2, for example by means of a sledge system, so that the device may be adapted to different types of keys, wherein the opening 103 and closing 104 pushbuttons are in different positions. In case the actuation system 6 is fixedly linked to the external housing 2, safety device 1 may comprise an adapting device 10 configured in such a way that the actuators may act on the opening 103 and closing 104 pushbuttons of controls via the adapting device 10 itself. Preferably, the adapting device 10 may comprise an internal housing 11 that may be removably housed inside the external housing 2 and suitable to surround at least partially the remote control 102 of the key 100. Said internal housing 11 may comprise the previously-mentioned leverage mechanism 9, which in turn is configured to actuate the opening 103 and closing 104 pushbuttons of predefined key types. Thus it is possible to use safety device 1 with different types of keys. In fact, it's just necessary to replace the adapting device, suitable for a key type, with another suitable for a different key type. Alternatively, the internal housing may not have a leverage mechanism and the actuation system may be linked and not linked to the internal housing so that it acts directly on the key to which the internal housing has been adapted.

With reference to the attached figures, some possible embodiments of the invention will be now described.

Figure 4:
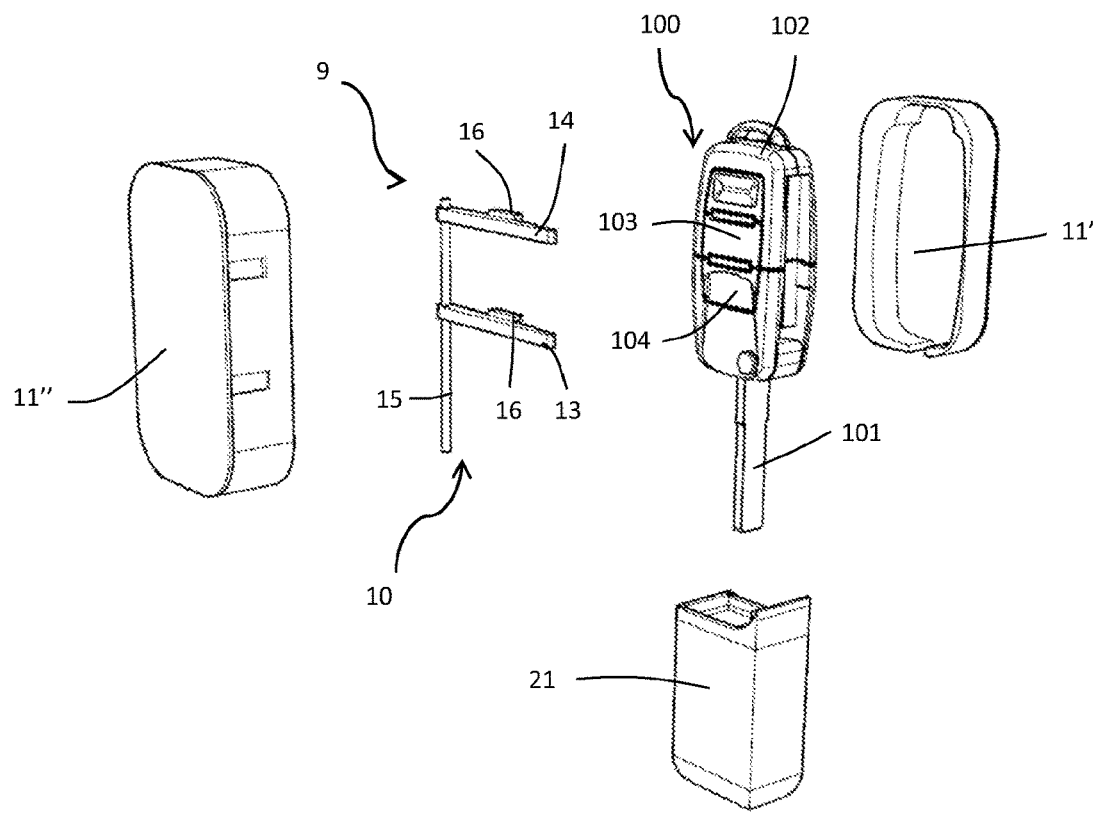
FIG. 4 is an exploded view of the safety device portion, including a key, in FIG. 3.
Figures 5A, 5B:
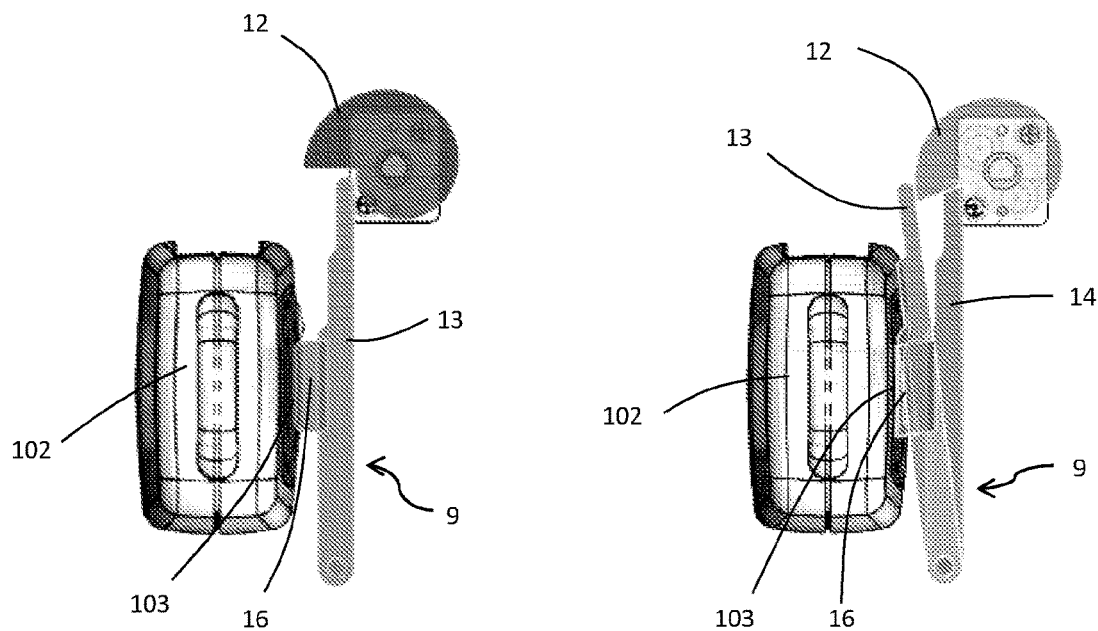
FIGS. 5*a* and 5*b* are two side views of a leverage mechanism of the safety device which actuates the opening and closing pushbuttons of a key according to a possible embodiment of the invention.

With reference to FIGS. 2-5, they represent a device 1 according to a possible embodiment. According to said embodiment, the actuation system 6 comprises a first 7 and a second 8 actuators, preferably rotary. Each actuator comprises a shaft with a cam 12 fixed at its end. The cam may have for example a helical profile, i.e. a gradually increasing radius. The profile generates a step in correspondence to the rise between the starting point and the end point of the helix. The leverage mechanism 9 comprises a first 13 and a second 14 leverages, each connected in a rotary manner at one end to a fixed axis 15, in particular fixedly linked to the internal housing 13. The opposite end of each leverage 13, 14 is free and shaped in such a way as to interact with its respective cam 12. As a result of said rotation, each leverage oscillates around the fixed axis 15 between a disengaged position (corresponding to the helix portion of the cam 12 with smaller radius, FIG. 5a) and an engaged position (corresponding to the helix portion of the cam 12 with larger radius, FIG. 5b), in such a way that its middle portion 16, preferably protruding, presses the respective opening 103 or closing 104 pushbuttons, as the leverage gradually reaches the engaged position. At the end of a complete rotation of 360° of the cam, the leverage reaches the previously mentioned step of the cam 12 itself and thus returns to the disengaged position, so that the middle protruding portion 16 drifts apart from the pushbutton, while releasing it. In order to ensure that, in this case, the leverage goes back to the disengaged position, suitable elastic means may be provided, which push each leverage towards its respective disengaged position. As shown for example in FIG. 3, the leverage mechanism 9 and in particular the leverages 13 and 14 are fixedly linked to the internal housing 11, which, according to the illustrated embodiment, comprises a first 11' and a second 11" portions, separable and connectable between them, so that the internal housing 11 may hold, at least partially in itself, the remote control 102 of the key 100 (FIG. 4). The first 7 and the second 8 actuators with their respective cams 12 are instead fixedly linked to the external housing 2. According to the illustrated embodiment, the key 100 portion inserted to start the car 101 may be held inside a fixed place 21 inside the external housing 2. Such a fixed place 21 preferably has a different shape, depending on the key type to hold into safety device 1.

Figure 9A:
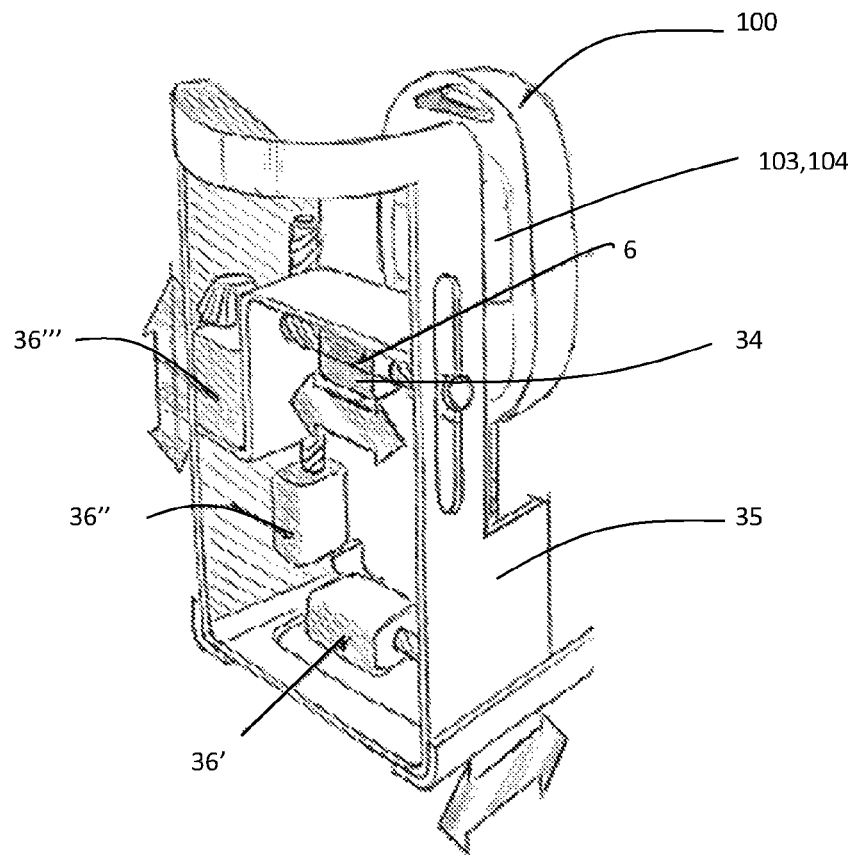
FIGS. 9a-9c are schematic illustrations of a portion of the safety device according to a further possible embodiment of the invention.
Figure 9B:
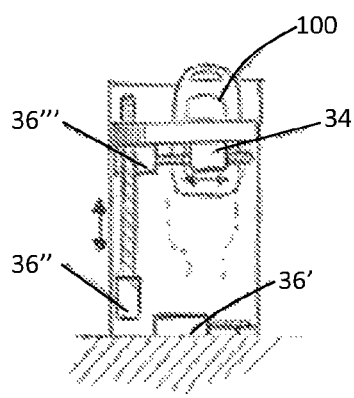
Figure 9C:
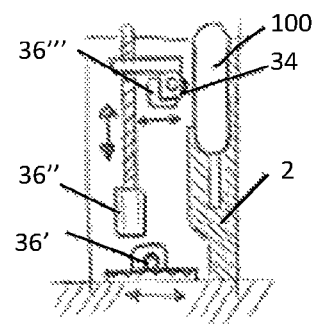

In accordance with a further possible embodiment (FIGS. 9a-9c), the actuation system 6 is movably linked to the external housing 2 and acts directly on the opening 103 and closing 104 pushbuttons of the key 100. Preferably, the actuation system 6 comprises a single actuator 34, moved by a motorized sledge structure 35, that moves the single actuator 34 along one or two or three axes. The motorized sledge structure 35 is preferably linked to the external housing 2 and comprises, according to the three-axis movable variant, three motion actuators 36', 36", 36'" which move the sole actuator 34 into a suitable position to press the opening 103 or closing 104 pushbuttons of the key 100, depending on the requested function. Key 100 is in a fixed position inside the external housing 2. According to this variant the actuation system 6 finds a proper position with respect to the key 100 depending on the key shape. The motorized positioning may occur, following the manual instructions given by the user or automatically, based on the coded characteristics of the key 100.

Figure 10A:
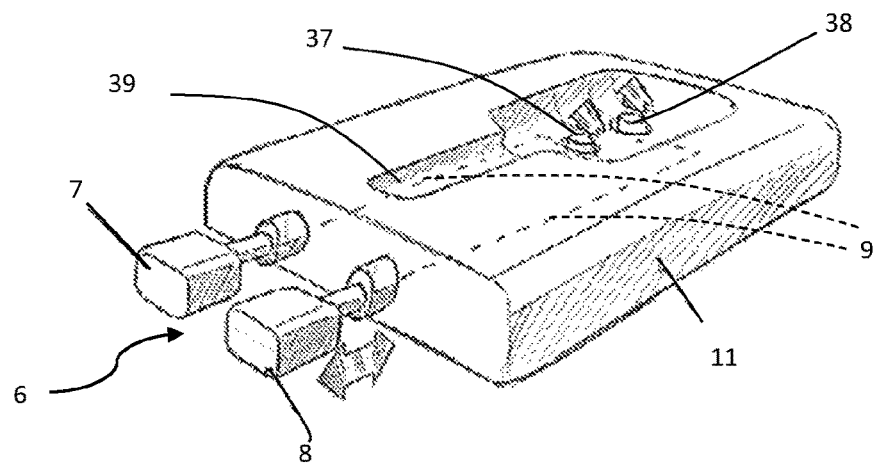
FIGS. 10a-10b are schematic illustrations of a portion of the safety device according to a further possible embodiment of the invention.
Figure 10B:
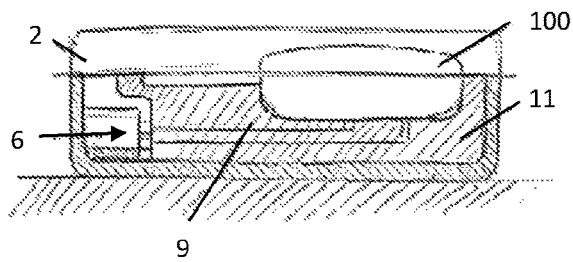

In accordance with a further possible embodiment (FIGS. 10a-10b), the actuation system 6 is fixedly linked to the external housing 2 and acts by means of a leverage mechanism 9 on the opening 103 and closing 104 pushbuttons of the key 100. The leverage mechanism 9 is held into an internal housing 11 adapted to hold the key, removable from external housing 2. The internal housing 11 is shaped in such a way as to be reversibly connectable to the actuation system 6, so that, once it is connected with the latter, the leverage mechanism 9 is connected with the actuation system 6 too. Preferably, the actuation system 6 comprises a first 7 and a second 8 actuators, connectable via the leverage mechanism 9 to a first 37 and a second 38 small pistons, adapted to respectively act on the opening 103 and closing 104 pushbuttons of the key 100, which is preferably held into a shaped place 39 of the internal housing 11 itself. According to this embodiment, it is possible to simply replace the internal housing 11 depending on the key 100 shape in order to adapt device 1 to the key itself. When the internal housing 11 is replaced, the actuation system 6, linked to the external housing 2, should be reconnected every time with the internal housing 11, equipped, as previously mentioned, with a suitable leverage mechanism 9.

Figure 11:
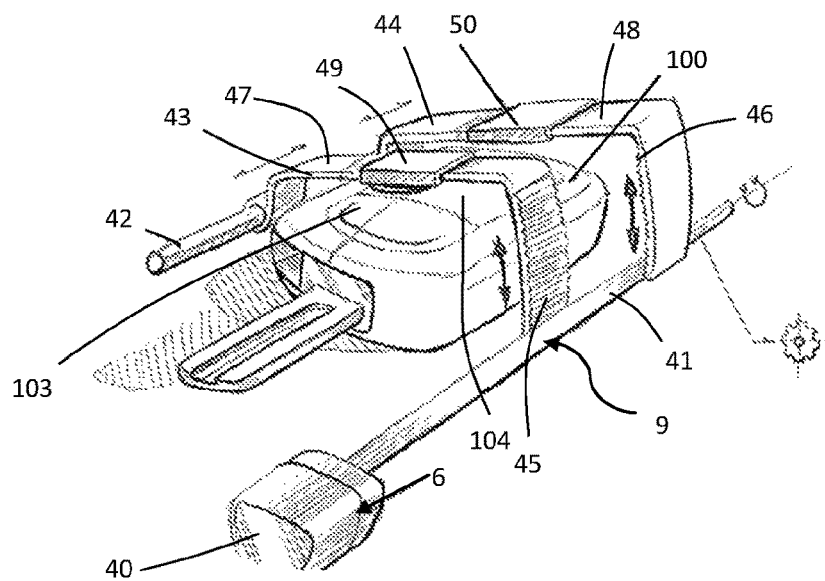
FIG. 11 is a schematic illustration of a portion of the safety device according to a further possible embodiment of the invention.

In accordance with a further possible embodiment (FIG. 11), the actuation system 6 is fixedly linked to the external housing 2 and acts via a leverage mechanism 9 on the opening 103 and closing 104 pushbuttons of the key 100, which is held in a fixed position in the external housing 2 of device 1. The leverage mechanism 9 is positioned into the external housing 2 and can be movable and configurable with respect to the latter, following different configurations, based on the characteristics of the key 100. Preferably, the actuation system 6 comprises a single actuator 40, fixedly positioned with respect to the external housing 2, which rotates an actuator shaft 41. The leverage mechanism 9 preferably comprises a rotating shaft 42 fixedly linked to the external housing 2 and parallel to the actuator shaft 41. The leverage mechanism 9 further comprises a first 43 and a second 44 leverages, rotating around the rotating shaft 42 and sliding along the same. At the opposite end, the first 43 and second 44 leverages comprise racks 45 and 46 which engage a cogged portion of the actuator shaft 41 on two opposite sides. So, as the latter, driven by the sole actuator 40, rotates in a predefined direction, the first 43 and the second 44 leverages rotate in opposite directions around the rotating shaft 42, approaching/moving away from the key 100. Preferably, each leverage 43, 44 comprises a transverse portion 47, 48 positioned between the actuator shaft 41 and the rotating shaft 42 and the touch probes 49, 50 which can slide with respect to the transverse portions 47, 48, so that they can be set in the correct position with respect to the opening 103 and closing 104 pushbuttons of the key 100. In this way, the touch probes 49, 50 are moved by the transverse portions 47, 48 of the leverages 43, 44. The positioning of the leverages 43, 44 with respect to the rotating shaft 42 and the positioning of the touch probes 49, 50 with respect to the transverse portions 47, 48 of the leverages 43, 44 can be manually done by the user, who is then able to adapt the device to any key type.

Figure 12A:
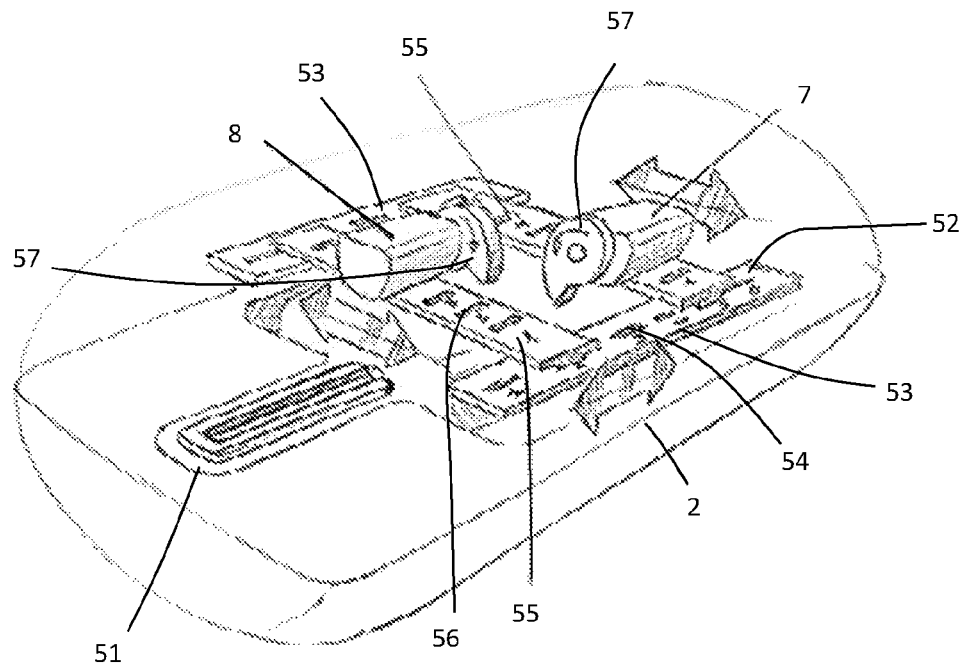
FIGS. 12a-12b are schematic illustrations of the safety device according to a further possible embodiment of the invention.
Figure 12B:
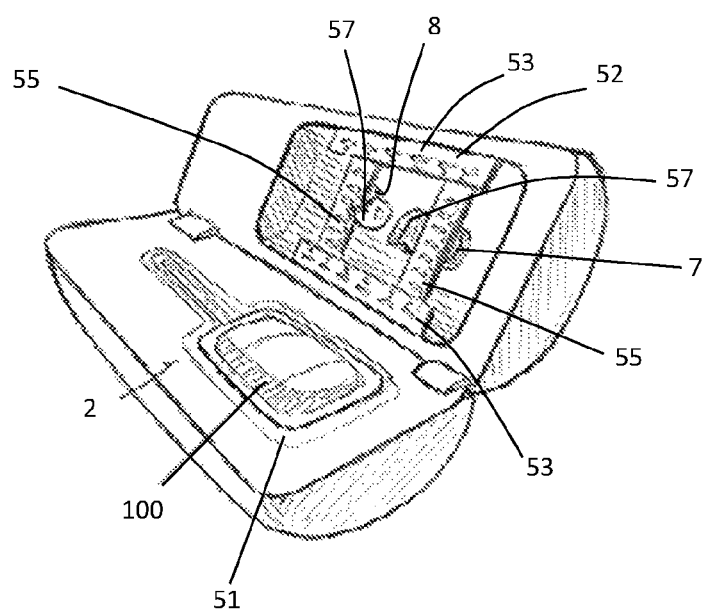

In accordance with a further possible embodiment (FIGS. 12a-12b), the actuation system 6 is removably linked to the external housing 2 and acts directly on the opening 103 and closing 104 pushbuttons of key 100, which is held in a fixed position inside the device, in particular in a place 51 of the external housing 2. Preferably, the actuation system 6 comprises a first 7 and a second 8 actuators removably linked to a support structure 52, fixedly linked to the external housing 2. The support structure 52 comprises two opposite uprights 53, provided with first notches, 54 and two crosspieces 55, provided with second notches 56. The two crosspieces 55 are removably linked to the two uprights 53, in correspondence to the different positions defined by the first notches 54, while the first 7 and the second 8 actuators are removably linked respectively to one of the crosspieces 55, in correspondence to the positions defined by the second notches 56. In this way, it is possible to set the actuators 7 and 8 in different positions depending on the key type, so that each may respectively act on the opening 103 or closing 104 pushbuttons of key 100. Preferably, each actuator comprises a cam 57, which turns around the axis of its respective actuator. The cams 57 have a helical profile, so that, as a consequence of the rotation, they can alternately press and release the opening and closing pushbuttons of the key. Device 1 according to this embodiment may suit any key type with no need to replace any of its parts.

Figure 13:
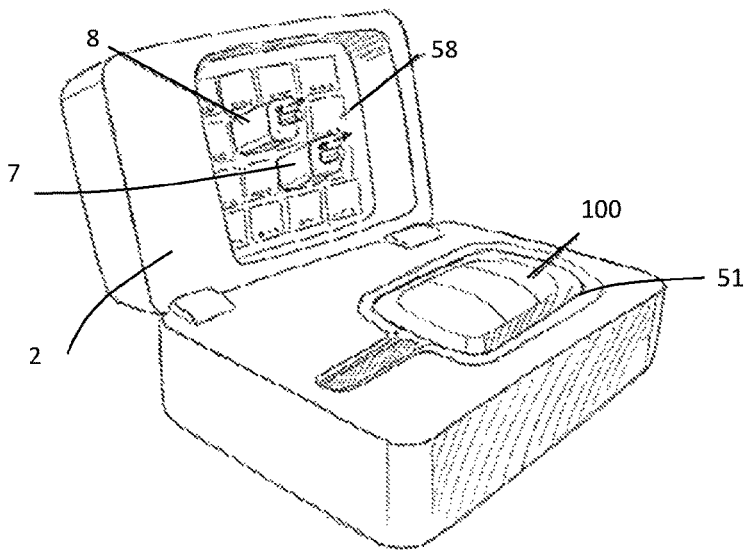
FIG. 13 is a schematic illustration of a portion of the safety device according to a further possible embodiment of the invention.

In accordance with a further possible embodiment (FIG. 13), the actuation system 6 is removably linked to the external housing 2 and acts directly on the opening 103 and closing 104 pushbuttons of the key 100, which is held in fixed position in the device, in particular in a place 51 of the external housing 2. Preferably, the actuation system 6 comprises a first 7 and a second 8 actuators removably linked to several actuator housings 58 arranged in a matrix in the external housing 2. A coordinate corresponds to each actuator housing 58. In this way it is possible to set the actuators 7 and 8 in different positions depending on the key type, so that each acts respectively on the opening 103 or closing 104 pushbuttons of the key 100. Each actuator preferably acts with linear motion on the opening or closing pushbuttons of the key 100. Device 1 according to this embodiment may be suited to any key type with no need to replace any of its parts.

Figure 14A:
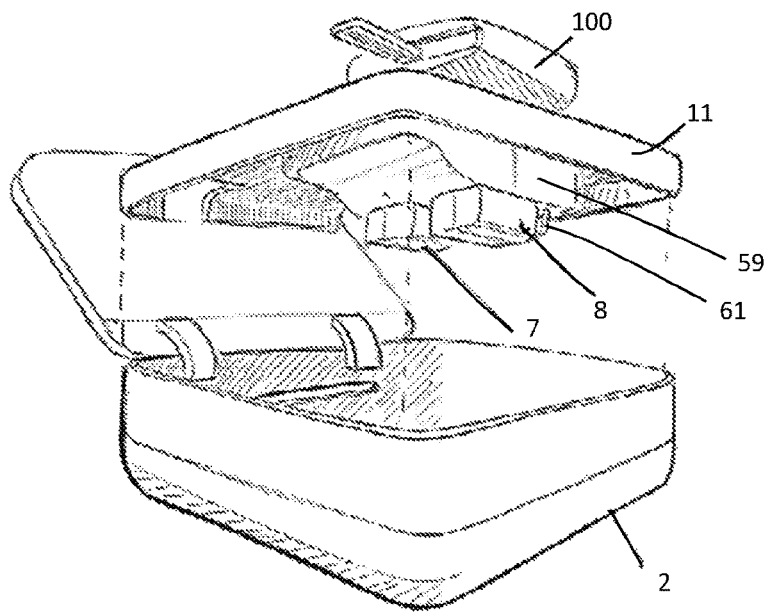
FIGS. 14a-14b are schematic illustrations of a portion of the safety device according to a further possible embodiment of the invention.
Figure 14B:
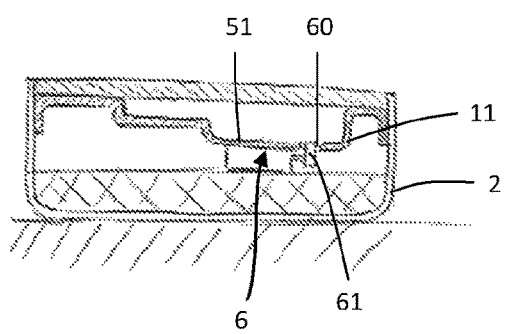
Figure 15A:
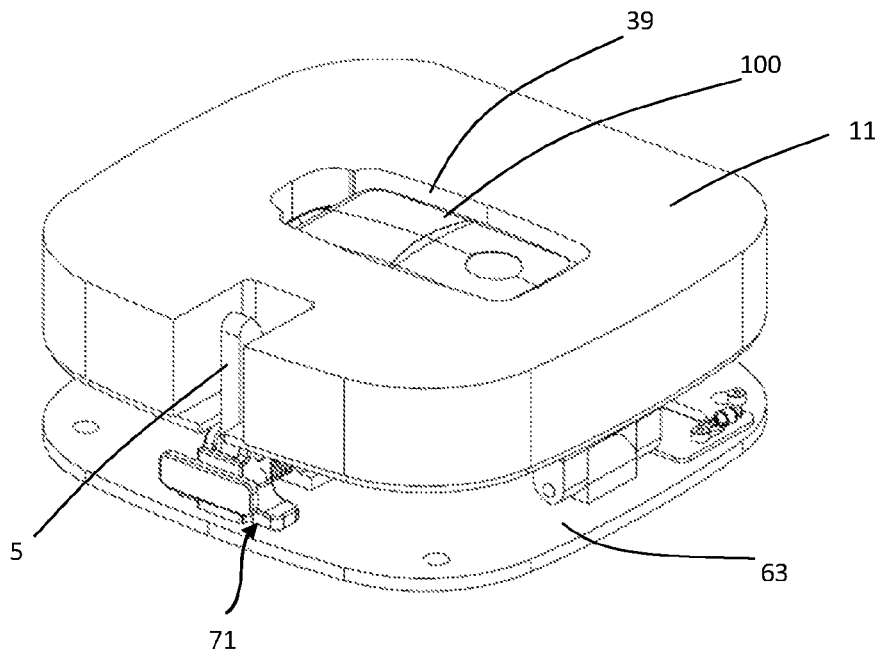
FIGS. 15a-15d are perspective and section views of the safety device according to a further possible embodiment of the invention.
Figure 15B:
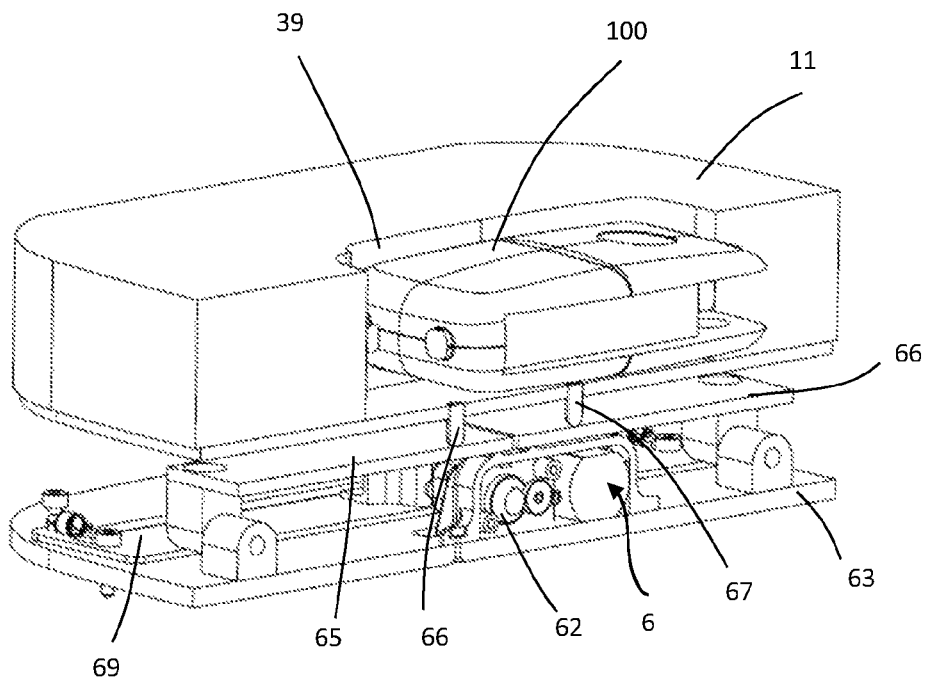
Figure 15C:
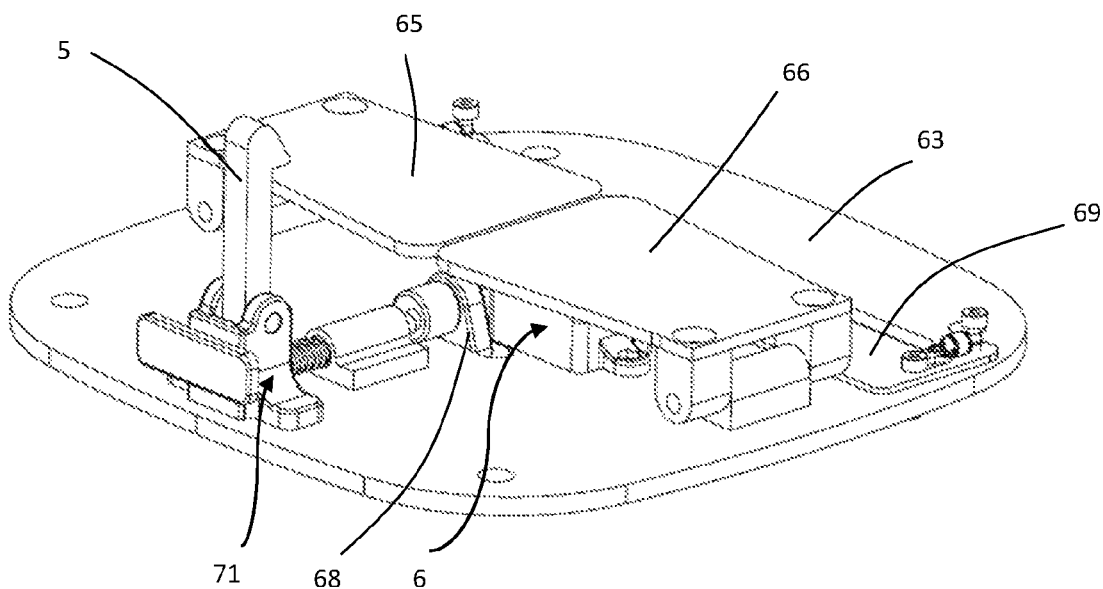
Figure 15D:
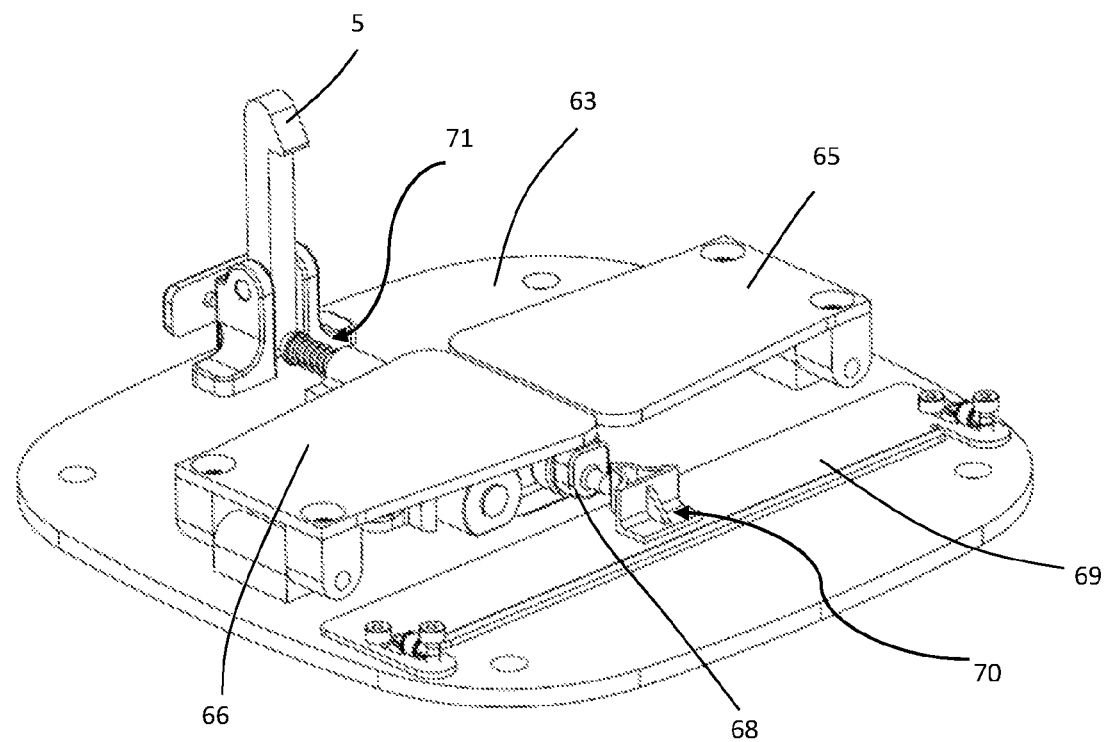

In accordance with a further possible embodiment (FIGS. 14a-14b), the actuation system 6 is removably linked to an internal housing 11, removable from the external housing 2 and shaped to hold the key 100 in a place 51. Said system acts directly on the opening 103 and closing 104 pushbuttons of the key 100. The internal housing 11 is shaped in such a way that the actuation system 6 is reversibly connectable to it. Preferably, the actuation system 6 comprises a first 7 and a second 8 actuators, which act directly on the opening 103 and closing 104 pushbuttons of key 100, for example by means of a cam mechanism 61 or by means of a linear mechanism, as the ones previously described. For example, the actuators 7 and 8 may be linked to the internal housing 11 in correspondence to a bottom wall 59 of the external housing 11 itself in the opposite direction of place 51, which holds the key 100. The bottom wall 59 may comprise some outlet openings 60 which connect the actuators 7, 8 with the place 51, where the key 100 is held. According to this embodiment, it is possible to adapt device 1 to a specific key simply replacing the internal housing 11, which should have a specific place for the key and which should be configured so that the removable actuators are set in a proper position for acting on the opening 103 and closing 104 pushbuttons. The actuators themselves are therefore connected and disconnected with different internal housings depending on the key type held in the device.

In accordance with a further possible embodiment, if the key to hold is keyless type, safety device 1 comprises a Faraday cage 30 suitable for containing the key itself. Such a Faraday cage 30 is configurable according to a shielded configuration and a non-shielded configuration. In the shielded configuration, the keyless key is unable to signal its presence and therefore, referring to the car example, the latter will not open and will not start even when safety device 1, with the key inside, is into the car itself. Conversely, when the Faraday cage 30 is in the non-shielded configuration, the key may signal its presence and therefore it will be possible to open and start the car by the key itself, held inside the device in the vehicle itself.

Figure 8A:
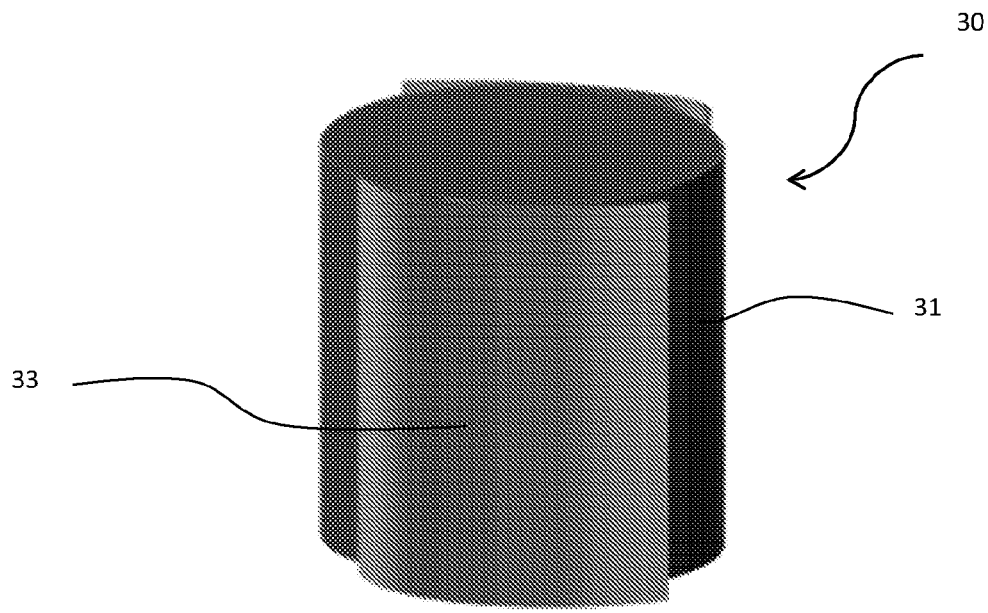
FIGS. 8*a* and 8*b* are two front views of a Faraday cage of a safety device, according to a further possible alternative embodiment of the invention.
Figure 8B:
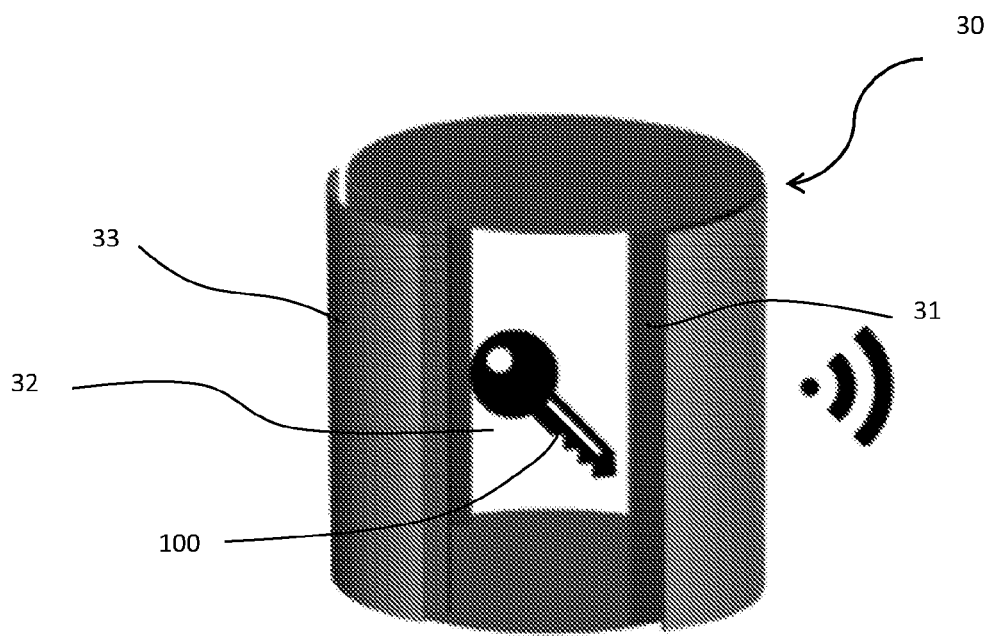

In accordance with the embodiment illustrated in FIGS. 8a and 8b, the Faraday cage 30 comprises a first hollow body 31, adapted to hold the key 100 and having at least one side opening 32, and a second body 33, movable with respect to the first body 31. For example, the second body 33 laterally slides and moves along the external sides of the first body 31. Both the bodies 31 and 33 make a shield through their portions of the Faraday cage 30. The second body 33 moves between a closing position (FIG. 8a), wherein it occludes the side opening 32 of the first body 31, and an opening position, wherein instead the side opening 32 of the first body 31 is clear. When the second body 33 is in the opening position, the Faraday cage is in the non-shielded configuration, while, when the second body is in the closing position, the Faraday cage 30 is in the shielded configuration.

Note that, advantageously, the Faraday cage 30 is positioned in a such a way that it does not interfere with, and in particular does not shield, the transmission unit of safety device 1 in any of its configurations.

The movement of the second body 33, with respect to the first body 31, may be implemented, for example, by means of an actuator, controlled by the command and control unit of device 1.

The Faraday cage 30 may, for example, be associated with the internal housing 11 of the safety device 1.

Note also that, if the keyless key is itself provided with opening and closing pushbuttons, safety device 1 comprises, advantageously, both the Faraday cage 30 (for shielding the proximity detection authorizing the start-up of the vehicle) and the actuation system 6 for acting on the opening and closing pushbuttons.

In accordance with a further possible embodiment (FIGS. 15a-15d), the actuation system 6 comprises a single actuator and a transmission 62, comprising for example several interconnected cogwheels, fixedly arranged on a support plate 63, fixedly linked to the external housing 2 or to a part of it. The transmission 62 is connected to a cam 68 suitable for interacting with a first palette 65 and a second palette 66, connected in a rotary manner with respect to the support plate 63. In particular, the transmission 62 is configured so that, when the single actuator rotates following a first direction, the cam 68 acts on the first palette 64, while, when the single actuator rotates following a second direction opposite to the first, the cam 68 acts on the second palette 66. An internal housing 11, adapted to receive in a place 39 the key 100, removable from the external housing 2, comprises a first 66 and second 67 pivots adapted to act on the opening and closing pushbuttons of the key, said pivots respectively moved by the first 64 and the second 65 palettes. The pivots 66 and 67 are in particular movable along a bottom wall of the housing 11 so as to have access to the place 39. In this way, depending on the rotation direction of the sole actuator, either the first pivot 66 acts on one of the opening/closing pushbuttons of the key, or the second pivot 67 acts on the other opening/closing pushbutton of the key. Note that the described embodiment functionally corresponds to the variant described with reference to FIGS. 10a-10b, wherein the first 66 and the second 67 pivots implement the leverage mechanism 9 in the internal housing 11. Even according to this embodiment, it is possible to simply replace the internal housing 11, with pivots 66 and 67 properly arranged based on the key 100 shape, for adapting device 1 to the key itself. When the internal housing 11 is replaced, the first 64 and the second 65 palettes interact with pivots 66 and 67, properly positioned with respect to the key.

Always referring to FIGS. 15a-15d, according to a further possible variant, the support plate 63 implements a portion of the previously-mentioned Faraday cage. In particular, the support plate 63 implements the Faraday cage together with the external housing 2. In order to allow the switching of the Faraday cage from the previously-mentioned shielded and non-shielded configurations, the support plate 63 comprises an opening and a body 69, movable with respect to said opening between a first position, wherein it occludes the opening, and a second position, wherein said opening is clear. When the movable body 69 occludes the opening, the Faraday cage is in the shielded position, while, when the movable body 69 lets the opening clear, the Faraday cage is in a non-shielded position. Advantageously, the transmission 62 is connected to the movable body 69, so as to move the latter between the two above-mentioned positions. For example, the movable body 69 may be pushed towards the closed position by springs, and the transmission 62 may be connected to a mechanism 70 adapted to move, for particular angular positions of the single actuator, the movable body 69 into the opening position. According to this variant, device 1 is at the same time suitable to be used with keyless keys as well as with keys provided with opening/closing pushbuttons. In case of keyless keys, it is possible, for example, to use an internal housing 11 without the previously-mentioned pivots 66 and 67, with no need for further changes to the device, which is therefore practically universal, i.e. adaptable to keys equipped with any kind of remote control.

Still referring to FIGS. 15a-15d, according to a further possible variant, transmission 62 is also connected to a further mechanism 71 linked to the lock 5, so that, at some angular positions of the single actuator, the lock 5 is opened or closed.

The actuation system, according to the possible above-described embodiments, may therefore simultaneously act on the lock 5, on the Faraday cage and on the leverage mechanism. It is then necessary to configure the transmission to correlate specific statuses of the lock, of the Faraday cage and of the leverage mechanism to specific angular positions of the actuation system, in particular of the single actuator.

Figure 16:
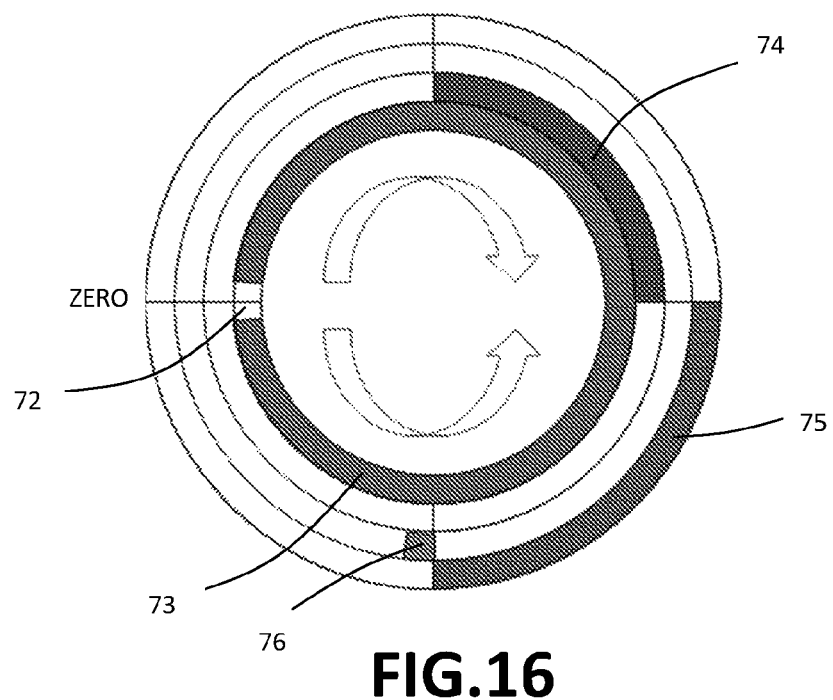
FIG. 16 is a diagram illustrating the correlation between the angular position of the actuation system and the configuration of parts of the safety device in FIGS. 15a-15d.

FIG. 16 shows a possible diagram of such correlation. With reference to said FIG. 16, ZERO indicates a conventional origin. The portion 72 indicates an angular range in the neighborhood of 0°, wherein no processes take place. The sector 73 indicates the opening condition of the Faraday cage, always preferably open except at the portion 72. The sector 74 indicates the actuation phase on the opening pushbutton, while the sector 75 indicates the actuation phase on the closing pushbutton. Finally, the sector 76 indicates the moment when the lock is authorized to open.

Safety device 1 comprises a command and control unit 17 configured to command the opening and closing of the lock 5, as well as the actuation system 6—if any—so that this actuates the opening 103 and closing 104 pushbuttons, or the Faraday cage—if any—so that said cage switches between the shielded and non-shielded configurations.

Figure 6:
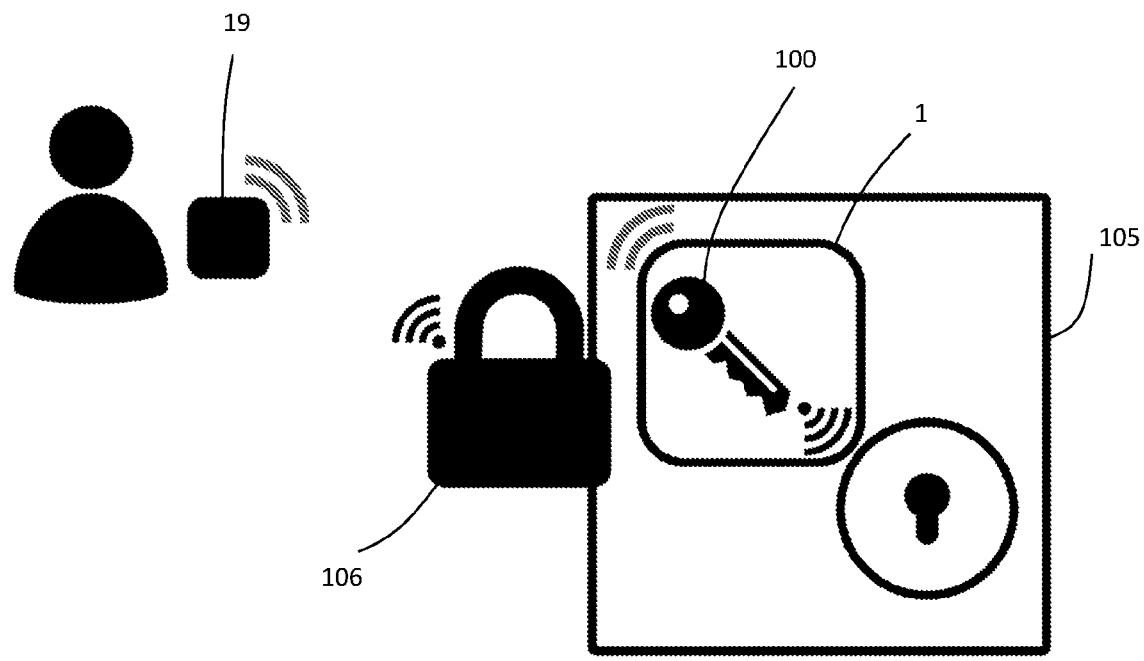
FIG. 6 is a schematic illustration of a system for holding and sharing among a plurality of users a key, comprising a safety device, according to a possible embodiment of the invention.
Figure 7:
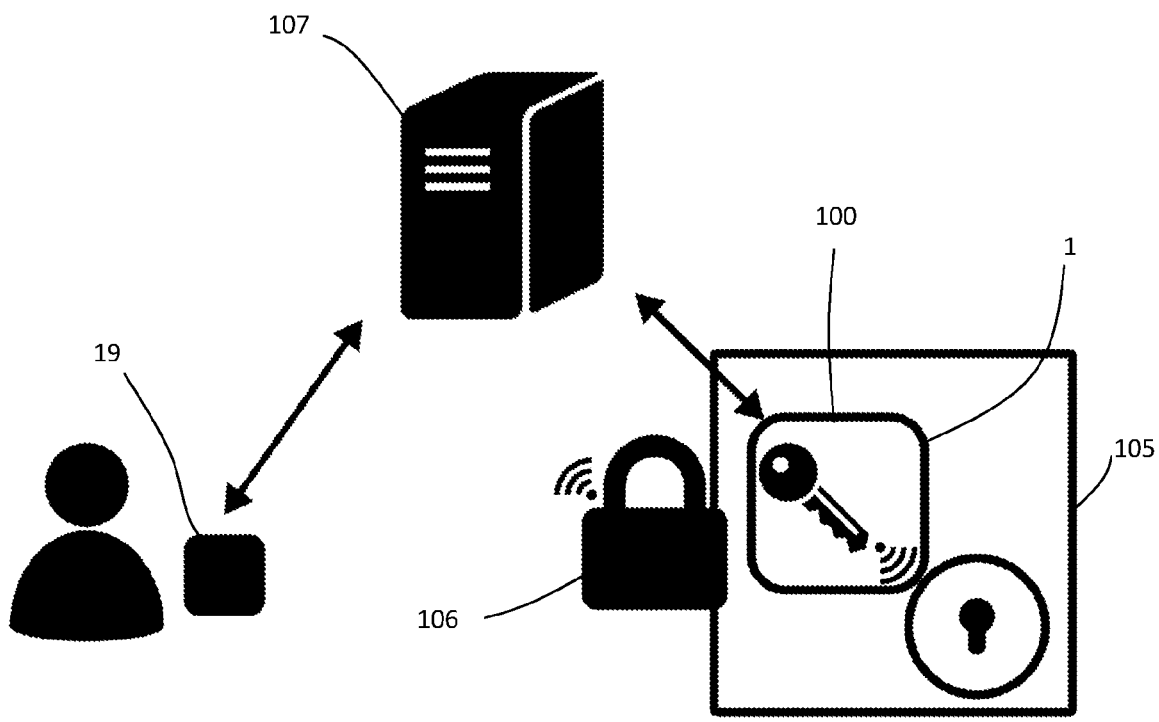
FIG. 7 is a schematic illustration of a system for holding and sharing a key among a plurality of users, comprising a safety device according to a further possible embodiment of the invention.

Safety device 1 further comprises a transmission unit 18 connected to the command and control unit 17, suitable for receiving command signals from an external command device 19, itself equipped with its own transmission unit. The transmission unit 18 may be long-range (for example, based on GPRS, UMTS, LTE technology) and/or short-range (by way of example, based on WI-FI, BLUETOOTH, NFC technology). By way of example, with reference to FIG. 6, the external command device 19 may for example be a portable device, such as a smartphone or a tablet, via which the user may communicate with safety device 1, sending it command signals. In particular, the external command device 19 may communicate with the transmission unit 18 of safety device 1 wirelessly, as previously stated, or alternatively via a remote management system (server 107, see FIG. 7) that filters and transmits the requests of the external command device 19 to safety device 1, for example by means of GPRS protocol.

With reference to the example of the car start up key equipped with a remote control, when safety device 1, with the key 100 inside, is placed in the vehicle (referred to as 105 in FIG. 6) in its closed configuration, the user, for example by his own smartphone 19, may send an unlock command signal to device 1, and consequently the command and control unit 17 will command the actuation system 6 for pressing the opening pushbutton 103 of the key 100 (and/or the Faraday cage 30 so that said cage switches into the non-shielded configuration), thereby opening the vehicle 105 lock 106. The command and control unit 17 will also command the lock 5 of safety device 1 in order that this switches into the open status, allowing then the user to access to the key 100 inside the external housing 2 of safety device 1. After using vehicle 105, the user may put again the key into safety device 1, close the external housing 2, get out of the vehicle, and, via his external command device 19, for example his own smartphone, send a lock command signal to safety device 1, in order that the command and control unit 17 commands the lock 5, so that it switches into the closed status, as well as the actuation system 6, so that said system presses the closing pushbutton 104 (and/or the Faraday cage 30 so that it switches into the shielded configuration), thereby closing again the lock 106 of the vehicle 105.

In order to ensure that only authorized users may send command signals to safety device 1, a special encrypted authorization program is advantageously loaded on the external command device 19 and/or on the server 107, that filters and transmits the requests, and/or on safety device 1 itself.

With reference to long-range communications between safety device 1 and the server 107, they can be encrypted, for example, with end-to-end encryption systems with mutual authentication.

With reference to short-range communications between the external command device 19 and safety device 1, the identification may be made using passwords, Secure Hash Algorithm or hardware key, i.e. a key exclusively supplied to the user, which should be inserted in the external command device 19 for its identification.

In addition, the encryption between the external command device 19 and safety device 1 can take advantage of the so-called Rolling Code technique. According to this method, safety device 1, for example via internet connection, receives from the server 107 a list of codes that enable communication between safety device 1 and the external command device 19. When the identified user wants to send command signals to safety device 1 by the external command device 19, the latter in turn connects itself to the server 107, downloading the above-mentioned codes. At this stage, the communication between the external command device 19 and safety device 1 is authorized through said codes.

Safety device 1 preferably comprises one or more batteries 20 for the power supply of its electrical, electro-activated or electro-controlled parts, in particular of the lock 5, of the actuation system 6 (if provided), of the Faraday cage 30 (if provided), of the transmission unit 18 and of the command and control unit 17. The battery 20 is preferably rechargeable and advantageously, for this purpose, device 1 comprises an input to connect a charger, which may for example be connected to the socket (by way of example, the vehicle cigarette lighter or a wall socket). According to a possible embodiment, the command and control unit 17 is configured so as to measure and/or estimate the battery charge and to send (light or sound) alerts when the battery reaches a charge level lower than a predefined threshold value.

According to a possible embodiment, device 1 is configured to exchange data, related to the use of safety device 1 itself, with the server 107. For example, said data may include the command history given to safety device 1 and the identity of the user who generated it.

In accordance with one embodiment, the command and control unit 17 is configured in such a way as to detect any possible tampering with safety device 1, such as for example attempts to open the external housing 2 by forcing the lock 5 without a previous unlock command from an authorized user.

For this purpose, safety device 1 may for example comprise one or more accelerometers and/or gyroscopes and/or magnetometers and/or absolute and/or relative position sensors, suitable for identifying movements of device 1 without a previous unlock command by an authorized user. Since in general safety device 1, when holding key 100, is kept within a protected environment, such as a stationary vehicle, any accelerations and/or rotational movements and/or general movements may indicate a tampering attempt.

Safety device 1 may further comprise a camera connected to the command and control unit 17, so that the command and control unit 17 sends an activation signal to the camera and said camera takes a photo, if a tampering attempt has been detected, for example by means of the above-mentioned accelerometers and/or gyroscopes and/or absolute and/or relative position sensors. The photo may for example be transmitted to the server 107, which files the picture taken by the safety device. Said picture may then be processed and analysed to identify for example the potential burglar.

In accordance with one embodiment, device 1 comprises a buzzer connected to the command and control unit 17, configured for sending a sound signal, if the command and control unit 17 itself detects a tampering attempt with the safety device, through the above-explained methods.

According to a further variant of the invention, safety device 1, instead of being portable, can be integrated in the protected environment, whose key it should hold. For example, referring to a car, the external housing of the safety device may be fully or partially integrated in a portion of the vehicle itself, for example in its dashboard or in its boot, or in one of its glove compartments.

By way of example, according to this variant, the open configuration of the safety device may be achieved when a drawer comes out or a door opens, if they are integrated into the vehicle portion. The closed configuration will be obtained when said drawer enters again or when said door closes.

In this way, not only safety device 1 may be used on an existing vehicle (aftermarket), but it may also be manufactured by an OEM (Original equipment manufacturer) to be integrated in the vehicle itself from the very beginning.

On the other hand, referring for example to home sharing, the external housing may for example be configured as a box, provided with an opening and closing door following the above-described methods. The box may, for example, be outside the house in order to grant secure sharing of keys among a plurality of people.

The skilled person, in order to satisfy specific contingent requirements, may make numerous additions, modifications or replacements of elements with others functionally equivalent to the described embodiments of the safety device according to the invention, without however departing from the scope of the appended claims.

The invention claimed is:

1. Safety device (1) for holding and sharing among a plurality of users a key (100) provided with a remote control (102) having an opening pushbutton (103) and a closing pushbutton (104), said safety device (1) comprising:
    an external housing (2) adapted to internally contain said key (100), configurable according to an open configuration and a closed configuration;
    a lock (5) that can be commanded for switching between a closed status, that prevents said external housing (2) in the closed configuration from switching into the open configuration, and an open status, that enables the external housing (2) to switch between the open and the closed configurations;
    means for interacting with said remote control (102) of the key (100), comprising an actuation system (6) fixedly linked to the external housing (2), that can be commanded to actuate said opening (103) and closing (104) pushbuttons of the remote control (102) when the key (100) is held inside the external housing (2) in the closed configuration;
    a transmission unit (18) configured to receive, directly or via an external server (107), command signals from an external command device (19), supplied to one user of said plurality of users, comprising its own transmission unit;
    a command and control unit (17) connected to said transmission unit (18) of safety device (1), configured for commanding said lock (5) and said actuation system (6) in response to the command signals;
    a leverage mechanism (9) such that said actuation system (6) acts on said opening (103) and closing (104) pushbuttons of the key (100) by means of said leverage mechanism (9);
    an internal housing (11) adapted to hold the key and removable from said external housing (2), wherein said leverage mechanism (9) is placed in said internal housing (11);
    wherein said actuation system (6) comprises a single actuator and a transmission (62) fixedly arranged on a support plate (63), fixedly linked to the external housing (2) or to a portion of it, wherein said transmission (62) is linked to a cam (68) capable of interacting with a first palette (65) and with a second palette (66) linked in a rotating manner with respect to the support plate

(63) depending on the direction of rotation of the single actuator, wherein said internal housing (11) comprises a first (66) and a second (67) pivots, respectively moved by the first (64) and the second (65) palettes and positioned to act on the key (100) opening and closing pushbuttons.

2. Safety device (1) according to claim 1, suitable to hold and share among a plurality of users of a key (100), provided with a remote control (102) configured for proximity detection, wherein said means for interacting with the remote control (102) comprise a Faraday cage (30) adapted to contain said key (100), wherein the Faraday cage (30) is configurable according to a shielded configuration and a non-shielded configuration, wherein the command and control unit is configured for controlling said Faraday cage (30) in response to command signals.

3. Safety device (1) according to claim 2, wherein the lock (5), the Faraday cage (30) and the leverage mechanism (9) are commanded by said actuation system (6).

4. Safety device (1) according to claim 1, wherein the support plate (63) implements said Faraday cage and comprises an opening and a body (69) which can be moved, with respect to said opening, between a first position, wherein the movable body (69) obstructs the opening, and a second position, wherein the movable body (69) leaves such opening clear, said first position corresponding to the shielded configuration of the Faraday cage, and said second position corresponding to the non-shielded configuration of the Faraday cage, wherein said single actuator moves the movable body (69).

5. Safety device (1) according to claim 3, wherein said single actuator moves said lock (5).

6. Safety device (1) according to claim 2, comprising a first hollow body (31) adapted to hold the key (100) and having at least one opening (32) for accessing to the key, and a second body (33), movable with respect to the first body (31), wherein said first (31) and second (33) bodies comprise portions of the Faraday cage (30), said second body (33) being movable between a closing position, wherein it obstructs the opening (32) of the first body (31), and an opening position, wherein it leaves the first body (31) opening (32) clear, the opening position of the second body (33) corresponding to the non-shielded configuration of the Faraday cage (30), and the closing position of the second body (33) corresponding to the shielded configuration of the Faraday cage (30).

7. Safety device (1) according to claim 1, wherein the command and control unit (17) is configured in such a way as to detect an attempt of tampering with safety device (1) in the absence of a previous command signal to unlock safety device (1) from the external command device (19).

8. Safety device (1) according to 23, comprising one or more accelerometers and/or gyroscopes and/or magnetometers and/or absolute and/or relative position sensors connected to the command and control unit, such command and control unit (17) being configured to detect an attempt to tamper with safety device (1) if said one or more accelerometers and/or gyroscopes and/or magnetometers and/or absolute and/or relative position sensors detect movements in the absence of a previous command signal to unlock safety device (1) from the external command device (19).

9. A safety device (1) according to claim 7, comprising a camera connected to the command and control unit (17), wherein said command and control unit (17) is configured in such a way that the camera takes a photo, if the command and control unit (17) has detected an attempt to tamper with safety device (1).

10. Safety device (1) according to claim 7, comprising a buzzer connected with the command and control unit (17), wherein said command and control unit (17) is configured in such a way as to command the buzzer, in order that this emits a sound signal when the command and control unit (17) has detected an attempt to tamper with safety device (1).

11. Safety device (1) according to claim 1, wherein said command and control unit (17) is configured for exchanging data with said external server (107), such data relating to the use of safety device (1) itself.

12. System for holding and sharing among a plurality of users a key (100), said system comprising:
    a safety device (1) comprising:
        an external housing (2) adapted to internally contain said key (100), configurable according to an open configuration and a closed configuration;
        a lock (5) that can be commanded for switching between a closed status, that prevents said external housing (2) in the closed configuration from switching into the open configuration, and an open status, that enables the external housing (2) to switch between the open and the closed configurations;
        means for interacting with said remote control (102) of the key (100), comprising an actuation system (6) fixedly linked to the external housing (2), that can be commanded to actuate said opening (103) and closing (104) pushbuttons of the remote control (102) when the key (100) is held inside the external housing (2) in the closed configuration;
        a transmission unit (18) configured to receive, directly or via an external server (107), command signals from an external command device (19), supplied to one user of said plurality of users, comprising its own transmission unit;
        a command and control unit (17) connected to said transmission unit (18) of safety device (1), configured for commanding said lock (5) and said actuation system (6) in response to the command signals;
    a leverage mechanism (9) such that said actuation system (6) acts on said opening (103) and closing (104) pushbuttons of the key (100) by means of said leverage mechanism (9);
    an internal housing (11) adapted to hold the key and removable from said external housing (2), wherein said leverage mechanism (9) is placed in said internal housing (11);
    wherein said actuation system (6) comprises a single actuator and a transmission (62) fixedly arranged on a support plate (63), fixedly linked to the external housing (2) or to a portion of it, wherein said transmission (62) is linked to a cam (68) capable of interacting with a first palette (65) and with a second palette (66) linked in a rotating manner with respect to the support plate (63) depending on the direction of rotation of the single actuator, wherein said internal housing (11) comprises a first (66) and a second (67) pivots, respectively moved by the first (64) and the second (65) palettes and positioned to act on the key (100) opening and closing pushbuttons; and
    a plurality of external command devices (19) supplied to said users, each external command device (19) comprising a transmission unit configured for sending command signals to said transmission unit (18) of safety device (1) directly or via an external server (107), wherein said external command device (19) or said external server (107) is configured to perform a user identification and send said command signals to safety device (1), only once the user has been identified.

13. System according to claim 12, wherein a cryptographic authorization program is loaded on the external command device (19) and/or on the external server (107) and/or on the safety device (1) itself.

14. Vehicle comprising a safety device (1) according to claim 1, wherein said external housing (2) is at least partially implemented by a portion of said vehicle.

* * * * *